J. T. BASSETT.
STEAM ACTUATED CAR BRAKE.
No. 4,732. Reissued Feb. 6, 1872.
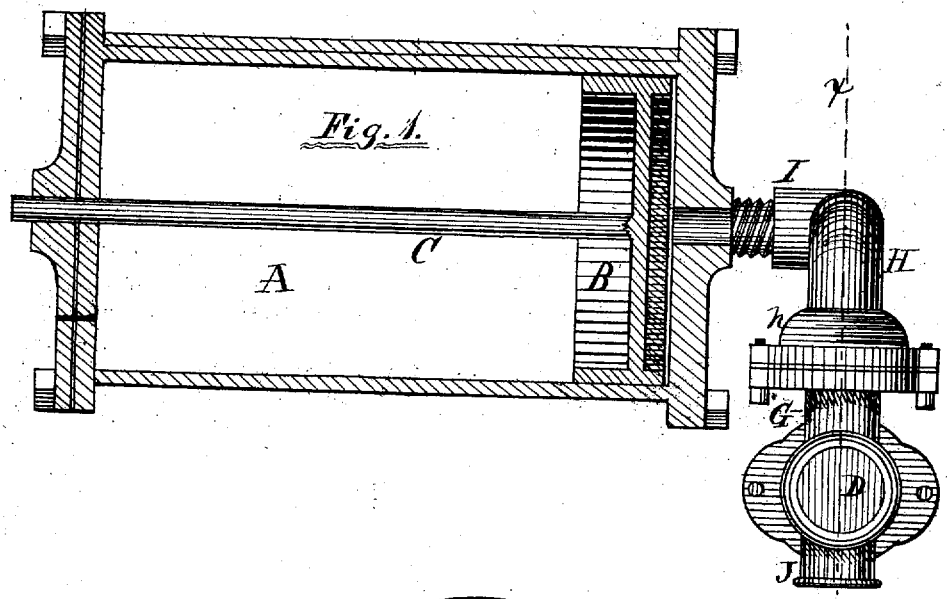
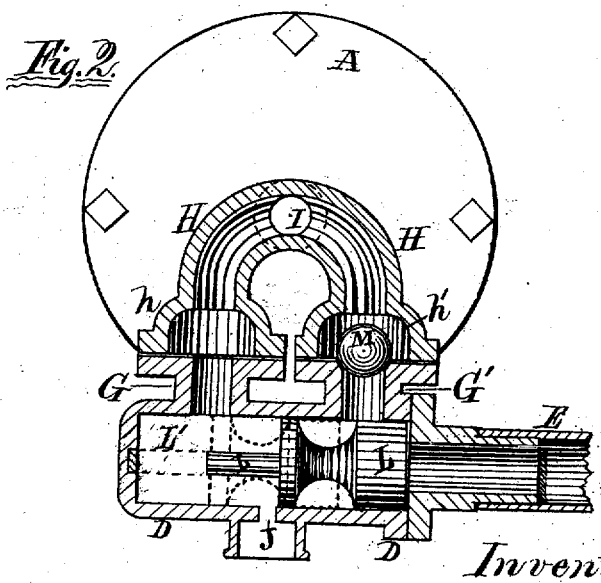
Witnesses:
Platt R. Richards,
J. J. Funnicliff.
Inventor,
John T. Bassett,
by W. B. Richards,
Atty.
THE NORRIS PETERS CO., PHOTO-LITHO., WASHINGTON, D. C.

UNITED STATES PATENT OFFICE.

JOHN T. BASSETT, OF GALESBURG, ILLINOIS, ASSIGNOR TO HIMSELF, JOHN BASSLER AND MARCELLUS S. MATTHEWS, OF SAME PLACE.

IMPROVEMENT IN STEAM-ACTUATED CAR-BRAKES.

Specification forming part of Letters Patent No. 119,913, dated October 17, 1871; reissue No. 4,732, dated February 6, 1872.

SPECIFICATION.

*To all whom it may concern:*

Be it known that I, JOHN T. BASSETT, of Galesburg, in the county of Knox and State of Illinois, have invented certain new and useful Improvements in Steam-Actuated Car-Brakes, of which the following is a specification:

My invention relates to that class of steam-actuating car-brakes in which the steam is carried back to a brake-operating cylinder beneath each car, by a pipe from the engine; and also to that class of brakes in which the power of steam is used to condense atmospheric air, which is led by one or more pipes to brake-operating cylinders below the different cars of the train. In actuating brakes of this description, the pressure which sets the brakes, having performed its function, is released by means of an escape at or near the engine or supply-tank, and a counter flow begins from the brake-operating cylinder which relieves the brakes; the steam or air being educted through the conducting-pipe, and not escaping until it reaches the said escape. The object of my invention is to allow the steam or air to escape before it reaches the engine or supply-tank, in order to relieve the brakes immediately or more effectually; and my invention consists in providing an escape or eduction for that purpose; and it also consists in an arrangement of valves and pipes to operate in connection with said eduction or escape, so that the brakes may be alternately set and released.

Figure 1 is an end view of a steam or air-actuated-brake apparatus illustrating my invention; and Fig. 2 is a sectional view of Fig. 1, on the plane of the line *x x*.

A is the brake-operating cylinder, constructed in the usual manner, for use with compressed air. B is the piston, and C the piston-rod, for transmitting the power of the compressed air in the cylinder A to the car-brakes in the usual manner. D is a short pipe, to which the flexible pipe E is attached at one end, the other end being attached to the main pipe leading from the engine or tank. G G′ are two short pipes communicating with pipe D at each end. H is an arched pipe, its ends enlarged to form valve-chambers *h h′*, which correspond with and are attached by gasket-joints to the upper ends of the pipe G G′. I is a short pipe communicating with and extending from the upper and central portion of the arched pipe H to the central portion of the head of the cylinder A. J is an eduction, opening, or escape in the lower side of the pipe D. L is a piston-valve in the pipe, or cylinder D. M is a ball-valve in the valve-chamber *h′*.

The operation of my invention is as follows: The compressed air or steam is let on from the engine or tank, and, passing from the main pipe through the pipe E, enters the end of the pipe D and drives the piston-valve L back to the position shown by the dotted lines L′, thereby opening the passage to the lower end of the pipe G′, through which the air ascends, and, raising the valve M, passes through the pipes H and I into the cylinder A, driving before it the piston B and rod C, which is connected with the brake-levers, and by said movement operates them. The moment that the pressure at the engine or tank is cut off and the back pressure or flow commences, the valve M will be driven to its seat, and the pressure against the rear end of the valve L will drive it to the right, opening the passage J and allowing the compressed air in the cylinder A to escape by pipes I, H, D, and J; and as the air escapes from said cylinder A the piston B will slide back to the position shown in the drawing, thus releasing the brakes on each car, and on the most distant car from the engine almost instantly—a thing impossible in trains of six or eight cars, and where the air must pass from the most distant car from the engine back to the engine or tank and escape before the brakes are released. The gasket-joints between the valve-chambers *h* and *h′* and the pipes G and G′ may be loosened; and, by turning the pipe D end for end and again attaching said gasket-joints, the air may be received from the opposite direction from that shown in the drawing.

Having thus described the nature and object of my invention, what I claim as new, and desire to secure by Letters Patent, is—

1. The combination of the eduction J, with the brake-operating cylinder of steam or air-actuated car-brakes, and so arranged as to allow the escape of the steam or air from each cylinder, and thereby release the brakes, without conducting the steam or air back to the engine for escape, substantially as set forth.

2. The eduction or escape J, in combination with the pipes D, G, H, and I, and valves L and M, for the purpose of allowing the steam or air to escape from each cylinder of steam or air-actuated car-brakes, substantially as set forth.

3. The valve devices D G H L M, when interposed between and arranged to operate with the brake-cylinder A B and pipe E, for the purpose specified.

4. The combination of pipes D, G, H, and I and valves L M with the brake-cylinder A B and eduction or escape J, substantially as and for the purpose specified.

JOHN T. BASSETT.

Witnesses:
M. D. COOKE,
ADAM EASON.